April 5, 1932.  W. C. DEAN  1,852,151
APPARATUS FOR CONTROLLING POWER SYSTEMS
Filed April 25, 1927
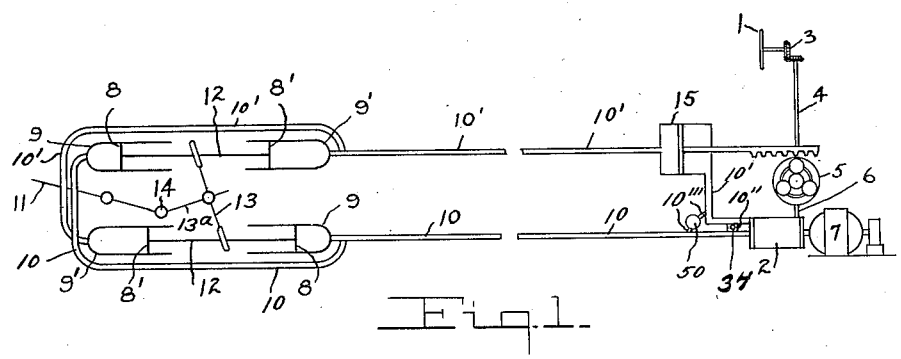
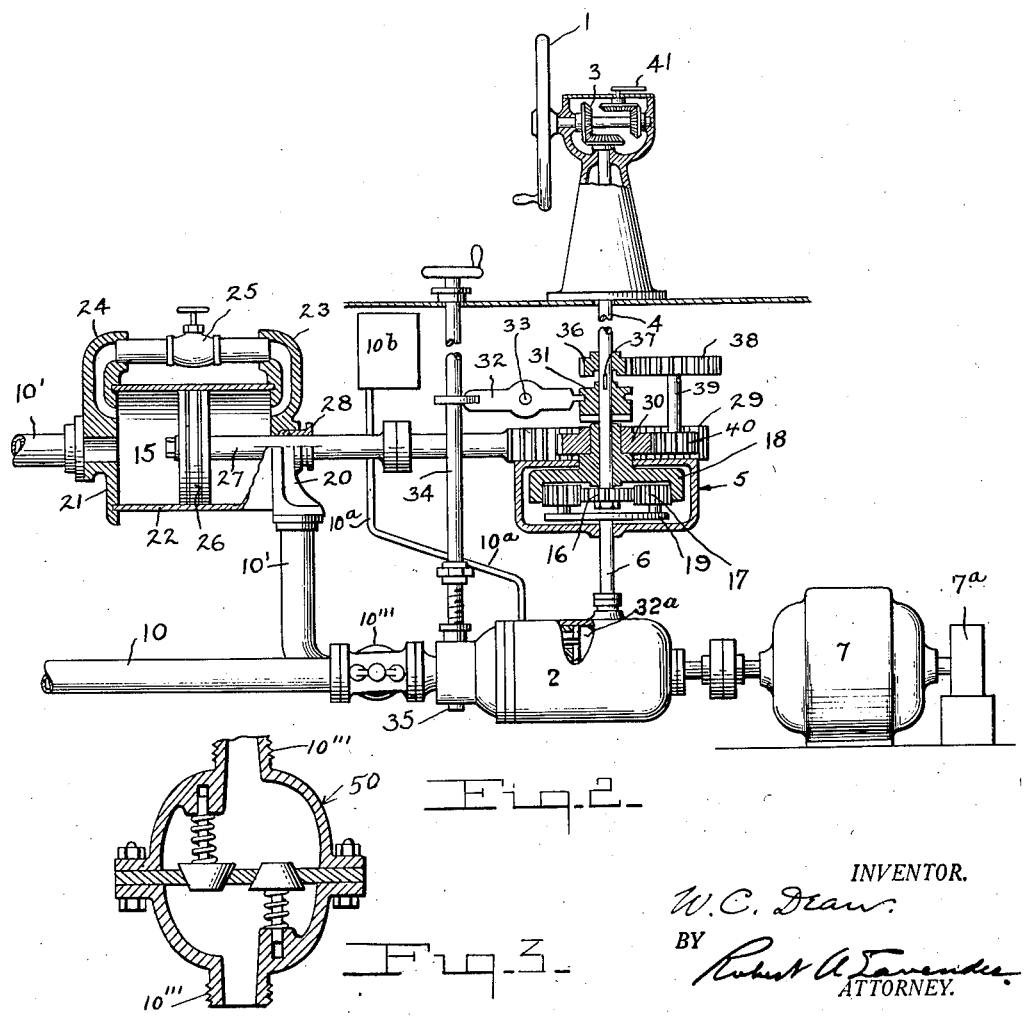
INVENTOR.
W. C. Dean
BY
ATTORNEY.

Patented Apr. 5, 1932

1,852,151

UNITED STATES PATENT OFFICE

WALTER C. DEAN, OF WASHINGTON, DISTRICT OF COLUMBIA

APPARATUS FOR CONTROLLING POWER SYSTEMS

Application filed April 25, 1927. Serial No. 186,557.

(GRANTED UNDER THE ACT OF MARCH 3, 1883, AS AMENDED APRIL 30, 1928; 370 O. G. 757)

My invention relates broadly to apparatus for controlling hydraulic and other work performing or power transmission systems and more particularly to the hydraulic steering of ships and vehicles.

In hydraulic systems the source of the fluid pressure and place where such pressure is converted into useful work are usually located at points remote from the station where the flow of said fluid is efficiently controllable. It frequently becomes essential to control, as well as maintain at a precise point, the remote means for converting said pressure into useful work. This heretofore has been impossible to be accomplished with precision owing to the remoteness of said means and its control and the impracticability of using the intervening space, and of obtaining reliable uniformly operable mechanical means, for such control and maintenance.

I have found that by separating the columns of fluid in the same fluid line, at a point adjacent the fluid control station, and between said separated columns placing a diaphragm or piston movable proportionate to the flow of fluid in said columns or system, such remote control may be readily attained with precision. By a relatively short, unjointed and substantially undeflectable, connecting means I connect said diaphragm or piston to said control means in such manner that the manually operable part of said control means, with its indicator, remains undisturbed by said connecting means while it changes the direction and rate of flow of said fluid in said columns or system, and gradually stops the flow of fluid in said columns when the required work, indicated by said indicator, has been performed, after said manually operable part has initially directed the flow of fluid into said system in the required direction and volume.

When my method and apparatus is employed for steering any vessel or vehicle, the manually operable part of the control means is operated to the required extent, thereby correspondingly opening the flow of the pressure fluid in the direction to perform the required corresponding movement of the steering mechanism as indicated by said indicator. As said fluid, directly or indirectly, exerts its pressure upon one side of the diaphragm or piston, and the column of said fluid separated thereby, to move substantially proportionately said steering mechanism and said diaphragm or piston, the latter slowly decreases and then stops the rate of flow of said fluid automatically bringing and maintaining said steering mechanism at the point indicated by said indicator, without shock to said hydraulic system and the mechanism operated thereby. Should a severe wave or a tug strike the rudder, or the vehicle strike a rut or obstacle at an angle, with such force as to be liable to cause breakage, automatic means are provided by me in such recurring contingencies to permit such excess pressure to cause the flow of the fluid in the hydraulic system independent of said control means until the pressure is reduced to normal. Such independent flow causes said diaphragm or piston to proportionately move and set the fluid flow control means to compensate said independent flow and bring the steering mechanism automatically and rapidly back to the position from which it was so stricken and thence to the point set and indicated by said manually operable part of the control means, or toward and to said set point accordingly as it may be stricken away from or toward its set point.

My method and apparatus may be employed in doing many other kinds of work in which the extent of movement of the driven mechanism is a function of the amount or value of such performed work. In such applications the manually operable part of the control means with its indicator is set to the proportionate extent of such desired work, and to correspondingly open the power control means, which latter is then proportionately moved, as said work is performed, to the point that it shuts off said power automatically when said work has been performed; and when said power is hydraulically or otherwise mechanically applied said shut-off is gradual so that no shock on the mechanism results.

In its broader aspect my method and means for said control may be practiced even in hydraulic systems without the actual separation of the hydraulic medium into columns, and is applicable to all power systems, since it broadly contemplates turning on, and indicating, the power to a degree proportionate to the extent of the power required, and then, as said power is supplied, it automatically proportionately causes said turning-on instrumentality to be returned toward its normal or turned-off position, which latter position is attained when the required power has been delivered; and which means, preferably the non-automatic part of said turning-on. means and its indicator, remain unchanged by said automatic return function.

Further objects of my invention will appear more fully hereinafter as the description of the method and apparatus is developed.

My invention specifically consists substantially in the construction, combination and arrangement of parts associated therewith or as will be more fully hereinafter set forth as shown by the accompanying drawings and finally pointed out in the appended claims.

Reference is to be had to the accompanying drawings forming a part of this specification in which like reference characters indicate corresponding parts throughout the several views and in which:—

Figure 1 is a diagrammatic sketch of the hydraulic steering apparatus of a ship containing the diagrammatic embodiment of my invention, Figure 2 is a detail view of the control apparatus embodying my invention.

Figure 3 is a central longitudinal sectional view of the conventional double acting relief valve 50.

Referring to Figure 1, 1 is the control wheel that controls the fluid pump 2 by means of miter gearing 3, shaft 4, differential 5, and shaft 6. The pump 2 is substantially the same as shown and described in United States Letters Patent numbered 1,020,285 issued March 12, 1912, to R. Janney for rotary pump or motor, and whose member 40 is represented herein by the numeral 6; whose pipes 30, 31 correspond herein to pipes 10, 10′; and whose pipe leading from its casing 10 is represented herein by the pipe 10a leading to the expansion tank 10b which is open at its top to the atmosphere. The control member 32a of pump 2 is the same as member 32 of said patent, while the other parts of pump 2 is a substantial duplicate of the structure of said patent. The pump is driven by means of a normally operating electric motor 7 having the usual solenoid brake means 7a which is applied only when motor 7 is not running, to then lock pump 2 from casual movement. According to the setting of shaft 6 the pump 2 pumps oil or other fluid under pressure into pipe line 10 from pipe 10′, or vice versa.

When said fluid pressure is applied to pipe line 10 the pressure thereof is applied in the diagonally located cylinders 9, to pistons 8 therein which correspondingly moves their respective axially aligned pistons 8′ in cylinders 9′, through their rigidly connecting piston rods 12, which causes a correspondingly backward flow of fluid in pipe line 10′. When said fluid pressure is applied to pipe line 10′ from pipe line 10 the pressure thereof is applied in the diagonally located cylinders 9′ to pistons 8′ therein, which correspondingly moves their axially aligned pistons 8 through their said piston-rods 12, which causes a corresponding backward flow of fluid in pipe line 10 to pump 2. The linear motion transmitted to the pistons 8 and 8′ is converted into rotary motion of the rudder 11 by means of the connecting rods 12, engaging opposite ends of rocker-arm 13 fulcrumed to a stationary part intermediate its ends and provided with a rigidly attached arm 13a linked to an arm of rudder 11 by bearing 14.

Referring particularly to Figure 2, 1 is the manually operable control wheel that controls the fluid pump 2 by means of miter gearing 3, shaft 4, differential 5 and the shaft 6. The differential 5 consists of a pinion gear 16 secured upon the end of the shaft 4. This pinion gear meshes with plurality of planetary gears 17 which in turn are enmeshed with the internal gear race 18 within the casing of the differential 5. The planetary 19 upon which the planetary gears 17 are revolubly mounted is rigidly connected to the shaft 6, that controls the rate and direction of flow from and to the hydraulic pump 2. When member 18 is held from movement shaft 6 is turned at a lesser rate than shaft 4.

A rack 29 meshes with a gear 30 which is freely mounted upon the hub of gear race 18. The gear 30 is secured to the hub of the gear race by means of a clutch member 31 upon the shaft 4 by clutch 31 freeing itself from spline 37 and with the clutch teeth on its lower face engaging corresponding clutch teeth on the hubs of internal gear 18 and gear 30. When the clutch member 31 is in its lower position, it is free to rotate upon and independent of the shaft 4. The clutch member is controlled by an arm 32 pivoted at a point 33 and controlled by the position of a shaft 34.

In pipe line 10 or 10′, for convenience the latter, I provide a means operable proportionate to, and in the direction of, the flow of fluid in said pipe line 10′, said means operating said rack 29. Said means may include a diaphragm or piston 26 separating the fluid in line 10′ from that which is supplied from or to the pump 2. When the fluid pressure is supplied to pipe line 10′ from pump 2 said pressure is directly applied to, and proportionately moves, diaphragm or piston 26 to correspondingly move rack 29 and the fluid on the opposite side of diaphragm or piston 26, which proportionately moves pistons 8 and 8' to likewise move the rudder 11, or other work performing means, to the extent predetermined by the extent of manual operation of wheel 1 and indicator 41. When pump 2 supplies fluid pressure from pipe line 10' to 10, it proportionately moves pistons 8, which, through connecting rods 12, operate pistons 8', which transfers said pressure to the fluid in pipe line 10' between pistons 8' and the diaphragm or piston 26, thereby causing to be moved toward pump 2 the fluid in said line 10' between said diaphragm or piston 26 and pump 2.

The rack 29 is preferably rigidly secured to connecting rod 27, which is preferably rigidly secured to diaphragm or piston 26, to operate said rack 29 substantially proportionately to the volume or other characteristic of the power applied to the performance of any required work.

When my method and means is employed for steering, and pump 2 or its driving motor 7 is inoperable for any cause, the steering may be manually done by opening valve 35 in pipe 10'', connecting pipes 10 and 10', see Figure 1, by operating shaft 34, in which open position of valve 35 the clutch 31 is moved upward, by rocker-arm 32, until the teeth on its upper face engages the teeth on the lower face of pinion 36, whereupon the manual operation of wheel 1 will move indicator 41 and pinion 36 correspondingly, the latter moving gear 30, through gears 38 and 40 on shaft 39, to move rack 29 and connecting rod 27, thereby moving diaphragm or piston 26, to move fluid in pipe lines 10 and 10' to move the steering means substantially proportionately to the degree or point indicated by said indicator 41. Thus may said steering means be moved and maintained, either by power or by hand operation, by the manual operation of wheel 1 and its indicator 41.

The pipe 10'' connects pipe lines 10 and 10' at a point between pump 2 and diaphragm or piston 26 to enable the apparatus to be operated manually or by mechanical power accordingly as valve 35 is opened or closed, respectively by the revoluble raising or lowering of shaft 34 which correspondingly moves arm 32 so that its clutch 31 is respectively in clutching engagement with the clutch teeth on the hubs of gears 18 and 30 or with gear 36, or at an intermediate position.

When my method of and apparatus for the control of power systems is applied to the hydraulic steering of vessels or vehicles, I provide a pipe 10''' connecting pipe lines 10 and 10' at a point in line 10' between pump 2 and diaphragm or piston 26, and in said pipe 10''' is a double acting relief valve 50 set to release in either direction upon the increase of the pressure in pipes 10, 10' and 10''', whereby, when a severe wave or a tug strikes the rudder, or the vehicle strikes a rut or obstacle at an angle, with such force as to otherwise endanger the breakage or undue straining of the mechanism, said valve 50 opens, thereby short-circuiting pump 2, so that the fluid in pipe lines 10 and 10' flows in either direction through pipe 10''' and thus relieves such stress upon the mechanism, which otherwise would break or unduly strain said mechanism. But in the aforesaid emergency of hand operation said relief valve 50 is not so essential since said stresses which it automatically relieves may be manually compensated. However, when pump 2 is moving, or maintaining in fixed position, the mechanism, and valve 50 is opened, the flow of the fluid through pipe 10''' from or to either pipe lines 10 or 10' will cause a proportionate movement of diaphragm or piston 26 and its rack 29, and thereby relatively move shaft 6 to cause fluid from pump 2 to be applied in such volume and direction in either pipe lines 10 or 10' that the vehicle or vessel will thereby automatically be brought back to its course as set by handwheel 1, and indicated by indicator 41, with celerity with the stoppage of the steering means on such regained course so progressively attained that shock to the hydraulic system and mechanism is eliminated.

The shaft 34 controls the position of bypass valve 35 for rendering the discharge from power operated pump 2 inoperative upon the fluid in pipe lines 10, 10' when it is desired to control the rudder by means of hand power by the apparatus to be hereinafter described.

For the manual control of the rudder a pinion 36 is mounted upon the shaft 4. This pinion is free to rotate about the shaft 4 when the clutch member 31 is in its lower position locking the pinion 30 to the hub of the gear race 18. When the clutch member 31 is raised by the opening of the by-pass valve 35, the clutch member 31 engages a key 37 and the pinion gear 36 locking clutch member 31 and gear 36 rigidly to the shaft 4. The pinion gear 36 engages a gear 38 fixed upon the upper end of a shaft 39 provided with suitable bearings in a portion of the frame, not shown. Upon the lower end of shaft 39 is fixed a gear 40 which meshes with the pinion gear 30 normaly free to revolve upon the hub of the gear race 18.

When it is desired to control the movement of the rudder by means of electric power, bypass valve 35 is closed. In this condition the member 31 is in the lower position. Any rotation of the wheel 1 is transmitted by means of the miter gearing 3 to the shaft 4, which rotation is indicated by the pointer 41 upon the steering stand. The rotation of the shaft 4 controls at the rate and direction of flow of the fluid from pump 2 to the hydraulic system through pipe lines 10 and 10'. The flow of fluid in the hydraulic system causes a movement of the diaphragm or piston 26 within the hydraulic system. This movement of the diaphragm or piston is imparted through gear 30 to the internal gear 18, causing its rotation in such direction and extent as to return the control shaft 6 of pump 2 to its neutral position at which there is no flow of fluid from pump 2.

When it is desired to control the movements of the rudder manually the by-pass valve 35 is opened. This movement raises the clutch member 31 to its upper position in which it releases the pinion gear 30 from its locking engagement with the hub of the internal gear 18 and locks the gear 36 to the shaft 4 whose revoluble movement is then transmitted through the gears 36, 38, 40 and 30 to rack 29. Movement of the wheel 1 is then translated into a linear movement of the diaphragm or piston 26 within the hydraulic system by means of the rack 29 and connecting rod 27. By this movement a flow of fluid is manually produced in the hydraulic system affording a manual performance and control of the steering or other required work.

Through fluid leakage or other losses the relative positions of the diaphragm or piston 26 and the steering or other work performing means may become disarranged so that the indicator 41 does not truly indicate the position or point at which said work performing means may be when pump 2 is neutral. To overcome this I provide openings 23 and 24 in members 20 and 21 on opposite sides of diaphragm or piston 26, and connect said openings to a valve 25. When pump 2 is supplying fluid pressure to pipe line 10' said valve 25 may be temporarily opened so that fluid from the then driven face of diaphragm or piston 26 is passed through valve 25 to replace said fluid losses in the hydraulic system, and said indicator 41 and the work performing means recalibrated, whereupon said valve 25 is closed.

Where great accuracy is required of indicator 41, and variable temperature conditions arise in the hydraulic system to a degree causing unequal expansion or contraction of the fluid in different parts of the hydraulic system, said conditions may be compensated by the temporary opening of valve 25.

It will be understood from the foregoing that the diaphragm or piston 26 is a means movable substantially proportionate to a function of the steering means, or any other work performing mechanism, and that any such means in practical proximity to the manual control station that turns off the power automatically and with precision when the required work has been performed may be employed in the practice of my invention whether or not said means separates the fluid into normally independent columns.

It will be understood that the above description and accompanying drawings comprehend only the general and preferred embodiment of my invention and that minor detail changes in the construction and arrangement of parts may be made within the scope of the appended claims without sacrificing any of the advantages of my invention.

The invention herein described may be manufactured and used by or for the Government of the United States of America for governmental purposes without the payment of any royalties thereon.

Having thus described my invention what I claim is as follows:

1. In a hydraulic mechanism including a motor-driven fluid-pump, means for controlling said pump and having a neutral position at which said pump is neutral, a plurality of cylinders, pistons within the cylinders, and a hydraulic system connecting the cylinders with the pump, the combination of a rotatable shaft, a differential upon the shaft, means for connecting the differential to said control means whereby said control means is operated by rotation of the shaft, and means within the hydraulic system for rotating the differential for returning to neutral said pump control means.

2. In a hydraulic mechanism including a motor-driven fluid-pump, means for controlling said pump and having a neutral position at which said pump is neutral, a plurality of cylinders, pistons within the cylinders, and a hydraulic system connecting the cylinders with the pump, the combination of a rotatable shaft, a differential upon the shaft, means for connecting the differential to said control means whereby said control means is operated by rotation of the shaft, and means within the hydraulic system for rotating the differential in a direction opposite to the direction of rotation of the differential by the shaft for returning to neutral said pump control means, said last named means being operated by the flow of fluid within the hydraulic system.

3. In a hydraulic mechanism including a motor-driven fluid-pump, means for controlling said pump, a plurality of cylinders, pistons within the cylinders, and a hydraulic system connecting the cylinders with the pump, the combination of a rotatable shaft, a pinion gear fixed upon said shaft, planet gearing meshing with the hereafter stated internal gear and said pinion gear, means for connecting the planet gearing to said control means, an internal gear rotatably mounted upon said shaft, manual means for operating said shaft and indicating the extent and direction of operation of the hydraulic system permitted by the operation of said pump control means by said shaft, and means adjacent said control means and operable proportionate to a function of said hydraulic system for operating said internal gear.

4. In a hydraulic mechanism including a motor-driven fluid-pump, means for controlling said pump, a plurality of cylinders, pistons within the cylinders, and a hydraulic system connecting the cylinders with the pump, the combination of a rotatable shaft, a pinion gear and an internal gear upon said shaft, planet gearing meshing with said internal gear and said pinion gear, means for connecting the planet gearing to said control means, a second gear rotatably mounted upon the shaft, a separate gear rotatably mounted upon the hub of said internal gear, gearing engaging said second gear and said separate gear, a mechanical clutch slidably mounted upon said shaft for rigidly locking said separate gear to said internal gear in one position of said clutch and for locking said second gear rigidly to said shaft in a different position of said clutch, a cylinder within said hydraulic system, a plunger within the cylinder, a connecting rod upon the plunger, a rack upon the connecting rod engaging said separate gear, and means for shifting the positions of the mechanical clutch.

5. In a hydraulic mechanism, the combination of a motor driven fluid-pump, means for controlling said pump, fluid motor means driven by said pump, a hydraulic system connecting said pump and motor means, a rotatable shaft, manual means for operating said shaft, a differential means for operatively connecting said control means to said shaft whereby said control means may be operatively moved from neutral position by said shaft, means extending within the hydraulic system for operating the differential to return to neutral said pump control means, means for operatively disconnecting said differential and connecting said shaft and said last named means, and means for operatively eliminating said pump from said hydraulic system.

6. In a hydraulic mechanism, the combination of a motor driven fluid-pump, means for controlling said pump, fluid motor means driven by said pump, a hydraulic system connecting said pump and motor means, a rotatable shaft, manual means for operating said shaft, a differential means for operatively connecting said control means to said shaft whereby said control means may be operatively moved from neutral position by said shaft, means extending within the hydraulic system for operating the differential to return to neutral said pump control means, means for operatively disconnecting said differential and connecting said shaft and said last named means, means for operatively eliminating said pump from said hydraulic system, and means for compelling the synchronous operation of said two last named means.

7. A source of hydraulic power, means adapted to be driven by said power; means, movable to an extent proportionate to a function of the power required, for turning on said power; means actuated by the second named means for indicating a function of said second named means, and means in contact with the hydraulic element and moved by said turned-on power a distance proportionate to the extent that the second named means is moved in turning on the power for automatically turning off the power only when the required power has been expended and without changing the indication of said indicating means.

8. A source of motive fluid power, means adapted to be driven by said power, means for controlling the supply of power to the driven means and having a neutral position at which no power is supplied, two operating means, differential means having elements thereof operatively connecting the controlling means severally with the two operating means; one of said operating means being adapted to be moved, an extent proportionate to a function of the power required and through said differential means to correspondingly move said controlling means without necessarily changing the position of the other one of said two operating means, for admitting the required power to said driven means; the other one of said two operating means being in contact with said fluid and adapted to be driven by and proportionate to the extent of the admitted required power, and, through said differential means, to return said controlling means to neutral position without necessarily changing the position of the first mentioned one of the two operating means for progressively returning the controlling means to neutral position by and during said admission of the required power to said driven means.

9. A source of hydraulic power, means adapted to be driven by said power, hydraulic supply piping intermediate said source and means, means for controlling the supply of hydraulic power to the driven means and having a neutral position at which no power is supplied, a first operating means, a second operating means extending in part within said piping, where it is adapted to be operated by hydraulic power that may be moving therein, differential means having elements thereof operatively connecting the controlling means severally with the first and second operating means, the first operating means and the controlling means through their connecting differential means being adapted to be moved an extent proportionate to a function of the power required without necessarily changing the position of the second operating means for admitting the required hydraulic power to the driven means, and the second operating means and the controlling means through their connecting differential means being adapted to be moved by said admitted hydraulic power without necessarily changing the position of the first operating means for progressively returning the controlling means to neutral position by and during said admission of the required power to said driven means.

10. A source of hydraulic power, means adapted to be driven by said power, manually operable means movable to an extent proportionate to a function of the power required for turning on said power; means for indicating a function of, and driven by, said second named means; and means in contact with the hydraulic element and operable by, and movable a distance proportionate to said function of, said turned-on power for automatically turning off said power only when the required power has been expended and without changing the indication of said indicating means.

11. The structure of claim 9 characterized by the further element of means for connecting the first operating means positively to the part of the second operating means extending within the piping for temporarily substituting the herein provided means for said source of hydraulic power for operating said driven means by the herein provided means.

12. The structure of claim 9 characterized by the part of the second operating means extending within said piping being a member adapted to separate into two columns the hydraulic medium within the piping, with a by-pass connecting said piping on opposite sides of said member, and a valve in said by-pass.

13. The structure of claim 9 characterized by the further element of means for connecting the piping during the period of undue stress on the driven means thereby temporarily short circuiting the hydraulic power from the driven means.

14. The structure of claim 9 characterized by the steering art in which the driven means is a steering means, and by the further elements of means for connecting the piping during the period of undue stress on the steering means thereby short circuiting the hydraulic power from the steering means when the latter may be moved by said stress, and means whereby when said undue stress terminates said short circuit is eliminated and said source of hydraulic power acts upon the steering means to overcome any movement thereof by said stress before the second operating means completes its function.

15. A source of hydraulic power, means adapted to be driven by said power, a hydraulic system connected thereto, means adapted to be driven by said power, means for turning on said power and movable proportionate to a function of the power required, means extending within said system and operated by the fluid therein for turning off said power and movable proportionate to said function of said turned-on power, means whereby when said first named means is subjected to undue stress said system is short-circuited intermediate said source and said third named means, and means whereby when said undue stress terminates said short circuit is eliminated.

16. A source of hydraulic power, means adapted to be driven by said power, a hydraulic system connected thereto, means adapted to be driven by said power, means for turning on said power and movable proportionate to a function of the power required, means extending within said system and operated by the fluid therein for turning off said power and movable proportionate to said function of said turned-on power, means for controlling said source of power; differential means interconnecting said second, third and fourth named means; means whereby when said first named means is subjected to undue stress said system is short circuited intermediate said source and said third named means, and means whereby when said undue stress terminates said short circuit is eliminated and said power acts upon said first named means to overcome the effect thereon of said undue stress before said third named means completes its said function.

17. A source of hydraulic power, means adapted to be driven by said power, means for turning on said power, means for turning off said power, a hydraulic system including a single continuous piping circuit connecting said third named means with said source of power and said first named means, and means for disconnecting said source of power from said system and driving said first named means by said second named means.

18. A source of hydraulic power, means for controlling said source, means adapted to be driven by said power, means for turning on said power, means for turning off said power including an element extending into and operated by liquid adapted to be contained in the hereinafter stated hydraulic system, a hydraulic system connecting said source of power and said second and fourth named means, and planetary gearing forming a part of and interconnecting said first, third and fourth named means.

WALTER C. DEAN.